United States Patent [19]
Watanabe et al.

[11] Patent Number: 5,691,070
[45] Date of Patent: Nov. 25, 1997

[54] POLYOLEFIN COMPOSITION, MOLDED ARTICLE THEREOF AND MULTILAYERED LAMINATE

[75] Inventors: Kazuyuki Watanabe; Satoshi Iwamoto, both of Oita, Japan

[73] Assignee: Showa Denko K.K., Tokyo, Japan

[21] Appl. No.: 661,544

[22] Filed: Jun. 11, 1996

Related U.S. Application Data

[62] Division of Ser. No. 321,517, Oct. 12, 1994.

[30] Foreign Application Priority Data

Oct. 13, 1993 [JP] Japan ................... 5-280240

[51] Int. Cl.⁶ .................. B32B 37/32; B32B 1/02; B65D 30/08
[52] U.S. Cl. .............. 428/516; 428/35.7; 428/35.2
[58] Field of Search ................. 428/516, 35.7

[56] References Cited

U.S. PATENT DOCUMENTS

| | | |
|---|---|---|
| 4,626,467 | 12/1986 | Hastetter . |
| 4,916,198 | 4/1990 | Schreve et al. . |
| 5,047,446 | 9/1991 | De Nicola . |
| 5,266,607 | 11/1993 | Lucas et al. . |
| 5,414,027 | 5/1995 | De Nicola et al. . |

FOREIGN PATENT DOCUMENTS

| | | |
|---|---|---|
| 0 053 925 | 6/1982 | European Pat. Off. . |
| 0 190 889 | 8/1986 | European Pat. Off. . |
| 5414749 A1 | 4/1993 | European Pat. Off. . |
| 62-158648 | 7/1987 | Japan . |

OTHER PUBLICATIONS

Derwent Abstract: Database WPI, Section Ch, Week 8849, AN: 88-351322 and JP-A-63-26 656.
Derwent Abstract: Database WPI, Section Ch, Week 9121, AN: 91-152134 and JP-A-3 086 515.
Kirk-Other Ency of Chem. Tech., Thrid Edition, vol. 16, 1981, p. 456.

*Primary Examiner*—Carman J. Seccuro, Jr.
*Attorney, Agent, or Firm*—Armstrong, Westerman, Hattori, McLeland & Naughton

[57] ABSTRACT

A polyolefin composition, which comprises: (A) 1 to 99% by weight of a polyolefin having the following properties of (a) to (e); (a) a ratio of kinematic viscosity $\eta_1$ at a frequency of $10^{-1}$ rad/sec to kinematic viscosity $\eta_2$ at a frequency of 10 rad/sec at a temperature of 190° C. according to a kinematic viscoelasticity determination method of 4 to 20, (b) a crystallization peak temperature Tcp according to a Differential Scanning Calorimetry of 110° C. to 130° C., (c) a ratio (Tmp/Tcp) of melting peak temperature Tmp to crystallization peak temperature Tcp according to a Differential Scanning Calorimetry of 1.1 to 1.5, (d) Tmp/(Tmp−Tcp)=3.0 to 9.8, and (e) a crystal structure exhibiting a-axial orientation in a diffraction pattern according to a X-ray diffraction method, and (B) 99 to 1% by weight of a propylene resin having the following properties of (f) and (g); (f) a ratio of kinematic viscosity $\eta_1$ at a frequency of $10^{-1}$ rad/sec to kinematic viscosity $\eta_2$ at a frequency of 10 rad/sec at a temperature of 190° C. according to a kinematic viscoelasticity determination method of below 4, and (e) and no crystallization structure exhibiting a-axial orientation in a diffraction pattern according to a X-ray diffraction method.

4 Claims, 1 Drawing Sheet

POLYOLEFIN COMPOSITION, MOLDED ARTICLE THEREOF AND MULTILAYERED LAMINATE

This is a Rule 60 Divisional Application of Ser. No. 08/321,517 filed Oct. 12, 1994.

BACKGROUND OF THE INVENTION

1) Field of the Invention

The present invention relates to a polyolefin composition, a molded article thereof and a multilayered laminate, and more particularly to a polyolefin composition having well-balanced properties in which anisotropy in mechanical strength generating during molding-processing is small, furthermore great tearability and superior rigidity, and to a molded article thereof, and also to a multilayered laminate being suitably used as a retort packaging material and excellent in tearability, rigidity, impact resistance and heat sealability.

2) Related Prior Art

Propylene resin is generally cheap and excellent in characteristics such as transparency, mechanical strength, heat resistance, gloss, chemical resistance, oil resistance, rigidity, flex fatigue resistance, etc., and is used in wide fields as various industrial materials and packaging materials.

When a propylene resin is molding-processed, its molecular chains are cooled to solidify in a stretched state toward a machine direction (hereinafter referred to as "M.D") by shear effects during molding-flowing, thereby generating remarkable anisotropy in properties. Generally, when orientation in a molded article is high, anisotropy in properties is generated in the molded article, whereby properties in a transverse direction to the flow (hereinafter referred to as "T.D") deteriorate.

Moreover, sometimes, heat resistance, weathering resistance, etc. deteriorate owing to interior strains due to molecular orientation. In order to improve it, various improving methods have been so far proposed and practically applied. For example, in extrusion molded films, there has been conducted secondary processing in which after molding biaxially stretched processing is conducted to keep the balance between M.D and T.D.

In injection molded articles and blow molded articles, there has been applied a method in which after molding a heat treatment is conducted.

However, the secondary processing method for films has such problems that not only a high cost for the processing is necessary, but also the use is limited since heat sealability deteriorates.

The method in which after molding a heat treatment is conducted provides complicated production steps and consequently has problems in economy and productivity.

Hitherto, as a packaging material for articles requiring a sterilizing treatment step, e.g, typically processed foodstuffs, a parcel that is called "retort pouch" has been used. In the pouch, for long term-preservation, laminates having layers being excellent in gas barrier property have been used.

Recently, as a material of a pouch being excellent in heat resistance, cold resistance and impact resistance, there have been used multilayered laminates comprising the combination of block copolymer of polypropylene used in most inner layer, a polyester film and an aluminum foil, e.g., layers of polyester/aluminum foil/block copolymer of polypropylene.

However, the above-mentioned multilayered laminates have a drawback that tearability thereof is inferior, thereby causing a problem that the pouch cannot be easily teared when it is opened.

In attempts to improve tearability, it has been proposed to set a V-shaped or I-shaped cut, to provide unpierced sewing machine perforations, to conduct a near infrared ray treatment or an electric discharge treatment (JP-A 62-158648) for tear-expecting portions, etc.

However, these procedures have a problem that tearability is still insufficient, so that a considerable force for tear is required owing to resistance for tear.

SUMMARY OF THE INVENTION

An object of the present invention, under the above-mentioned circumstances, is to provide a polyolefin composition having well-balanced properties in which anisotropy in mechanical strength generating during molding-processing is small, furthermore great tearability, superior rigidity, and a molded article thereof, and a multilayered laminate being excellent in tearability, rigidity, impact resistance and heat sealability.

As a result of extensive studies to solve the problems of prior art, the present inventors have found that a polyolefin composition comprising a propylene resin and polyolefin having a particular kinematic viscosity ratio and a particular crystal structure can solve the problems and have established the present invention.

According to one aspect of the present invention, there is provided a polyolefin composition, which comprises:

(A) 1 to 99% by weight of a polyolefin having the following properties of (a) to (e);
  (a) a ratio ($\eta_1/\eta_2$) of kinematic viscosity $\eta_1$ at a frequency of $10^{-1}$ rad/sec to kinematic viscosity $\eta_2$ at a frequency of 10 rad/sec at a temperature of 190° C. according to a kinematic viscoelasticity determination method of 4 to 20,
  (b) a crystallization peak temperature Tcp according to a Differential Scanning Calorimetry (DSC) of 110° to 130° C.,
  (c) a ratio (Tmp/Tcp) of melting peak temperature Tmp to crystallization peak temperature Tcp according to a Differential Scanning Calorimetry (DSC) of 1.1 to 1.5,
  (d) Tmp/(Tmp−Tcp)=3.0 to 9.8, and
  (e) a crystal structure exhibiting a-axial orientation in a diffraction pattern according to a X-ray diffraction method, and (B) 99 to 1% by weight of a propylene resin having the following properties of (f) and (g);
  (f) a ratio ($\eta_1/\eta_2$) of kinematic viscosity $\eta_1$ at a frequency of $10^{-1}$ rad/sec to kinematic viscosity $\eta_2$ at a frequency of 10 rad/sec at a temperature of 190° C. according to a kinematic viscoelasticity determination method of below 4, and
  (g) no crystal structure exhibiting a-axial orientation in a diffraction pattern according to a X-ray diffraction method.

According to another aspect of the present invention, there is provided a multilayered laminate which comprises the following (i) and (ii):

(i) a layer of a polyolefin composition comprising;
  (A) 1 to 99% by weight of a polyolefin having the following properties of (a) to (e);
    (a) a ratio ($\eta_1/\eta_2$) of kinematic viscosity $\eta_1$ at a frequency of $10^{-1}$ rad/sec to kinematic viscosity $\eta_2$ at a frequency of 10 rad/sec at a temperature of 190° C. according to a kinematic viscoelasticity determination method of 4 to 20, (b) a crystallization peak temperature Tcp according to a Differential Scanning Calorimetry (DSC) of 110° to 130° C., (c) a ratio (Tmp/Tcp) of melting peak temperature Tmp to crystallization peak temperature Tcp according to a Differential Scanning Calorimetry (DSC) of 1.1 to 1.5, (d) Tmp/(Tmp–Tcp)=3.0 to 9.8, and (e) a crystal structure exhibiting a-axial orientation in a diffraction pattern according to a X-ray diffraction method, and (B) 99 to 1% by weight of a propylene resin having the following properties of (f) and (g);

(f) a ratio $(\eta_1/\eta_2)$ of kinematic viscosity $\eta_1$ at a frequency of $10^{-1}$ rad/sec to kinematic viscosity $\eta_2$ at a frequency of 10 rad/sec at a temperature of 190° C. according to a kinematic viscoelasticity determination method of below 4, and (g) no crystal structure exhibiting a-axial orientation in a diffraction pattern according to a X-ray diffraction method, and (ii) a layer of (C) block copolymer of propylene/ethylene.

DETAILED DESCRIPTION OF THE INVENTION

Figure 1:
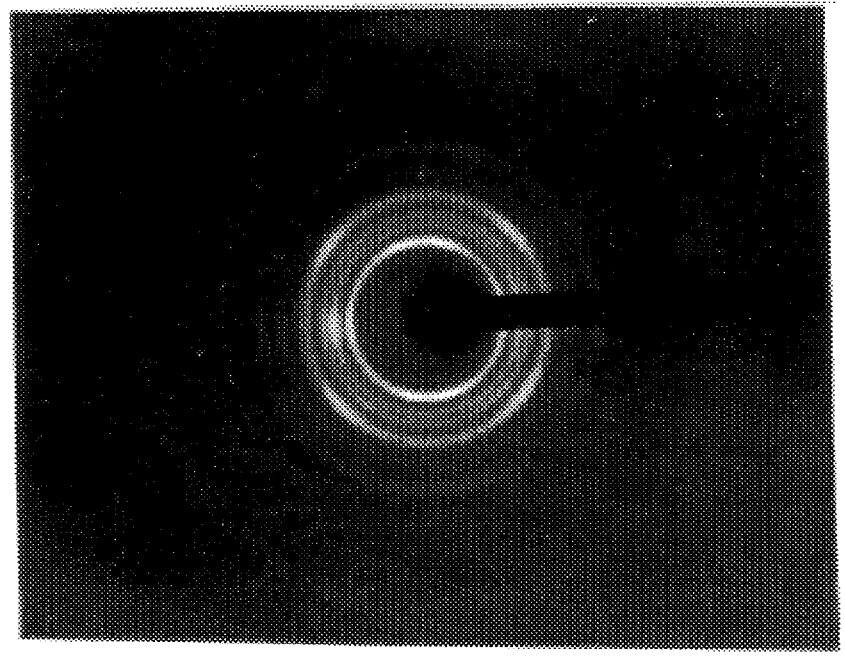
FIG. 1 is a photograph showing a diffraction image of polypropylene (PP–2) in the present invention according to a X-ray diffraction method.

The present invention will be described in detail below.

The (A) polyolefin for use in the present invention includes polyethylene, polypropylene, random copolymer of ethylene/propylene, block copolymer of ethylene/propylene, three-dimensional copolymer of ethylene/butene/propylene, copolymer of ethylene/α-olefin having 4 to 12 carbon atoms, etc. Examples of a α-olefin include butene-1, 4-methylpentene-1, hexene-1, octene-1, etc.

It is necessary that the (A) polyolefin has (a) a ratio $(\eta_1/\eta_2)$ of kinematic viscosity $\eta_1$ at a frequency of $10^{-1}$ rad/sec to kinematic viscosity $\eta_2$ at a frequency of 10 rad/sec at a temperature of 190° C. according to a kinematic viscoelasticity determination method of 4 to 20.

The term "kinematic viscoelasticity" herein means behaviors of the combination of viscosity and elasticity on vibrational (angular frequency) application of strains and stresses to a material. The kinematic viscoelasticity is determined by measuring a stress vs. a strain or a strain vs. a stress, e.g., according to the methods prescribed in ASTM D4065-90 and ASTM D4092-90.

In the present invention, particularly, the kinematic viscoelasticity in the range of $10^{-3}$ to $10^2$ rad/sec was determined by Mechanical Spectromer, Model RMS-800, made by Rheometric Co., Ltd., at 190° C. using a parallel plate.

The kinematic viscosity ratio $(\eta_1/\eta_2)$ is 4 to 20, preferably 4 to 15, more preferably 5 to 15. When the kinematic viscosity ratio is below 4, anisotropy is large, whereby the balance between M.D and T.D deteriorates, whereas above 20 gel or fish-eyes increase, so that degradation of commodity's commercial value unpreferably occurs.

It is necessary also that the (A) polyolefin has (b) a crystallization peak temperature Tcp of 110 to 130° C., (c) a ratio (Tmp/Tcp) of melting peak temperature Tmp to crystallization peak temperature Tcp of 1.1 to 1.5 and (d) Tmp/(Tmp–Tcp)=3.0 to 9.8 according to a Differential Scanning Calorimetry (DSC).

Tcp is preferably 112° to 127° C., more preferably 113° to 125° C. When Tcp is below 110° C., anisotropy in mechanical strength becomes large, whereas above 130° C. mechanical strength such as impact strength, etc., becomes unpreferably insufficient.

When Tmp/Tcp is below 1.1, flexibility and mechanical strength such as impact strength, etc., are insufficient, whereas above 1.5 anisotropy in mechanical strength is unpreferably generated.

When Tmp/(Tmp–Tcp) is below 3.0, anisotropy in mechanical strength is generated, whereas above 9.8 flexibility and mechanical strength such as impact strength etc., are unpreferably insufficient.

The "Differential Scanning Calorimetry (DSC)" herein is a method in which a thermal change in a sample generating on elevating and lowering its temperature at a constant rate is determined as a thermal energy. The determination method is prescribed in ASTM D3417-75. The DSC for Tcp and Tmp is as follows.

That is, in polyethylene, Tcp is a crystallization peak temperature in case of elevating a temperature to 190° C. and then keeping at 190° C. for 5 minutes, followed by lowering the temperature to 30° C. at a temperature-lowering rate of 10° C./minute, and Tmp is a melting peak temperature in case of again elevating the temperature to 190° C. at a temperature-elevating rate of 10° C./minute.

In propylene resin, Tcp is a crystallization peak temperature in case of elevating a temperature to 230° C. and then keeping at 230° C. for 5 minutes, followed by lowering the temperature to 30° C. at a temperature-lowering rate of 20° C./minute, and Tmp is a melting peak temperature in case of again elevating the temperature to 230° C. at a temperature-elevating rate of 20° C./minute.

Furthermore, it is necessary that the (A) polyolefin has (e) a crystal structure exhibiting a-axial orientation in a diffraction pattern according to a X-ray diffraction method.

The "X-ray diffraction method" herein is an analytical method applied phenomena that when a X-ray is irradiated to a crystal, scattered X-rays cancel each other in the direction wherein the wave phase is out of accord with each other and amplify each other in the direction wherein the wave phase is in accord with each other.

There is a large number of researches concerning analysis of crystal structure of polyolefin according to a X-ray diffraction pattern, e.g., L. E. Alexander, "X-Ray Diffraction Method in polymer" Interscience (1969), "Kobunshi" Vol. 14, No.158, P379 to 388, "Nihon Kagakukaishi", Vol 82, No.12, P1575 to 1577, etc.

In the present invention, particularly, a film having a thickness of 60 μm was irradiated in point focus for one hour under the conditions of 50 KV and 40 mA by a X-ray diffraction apparatus, made by K.K., Rigaku, Japan, RAD-II type C and then the diffraction pattern was measured with a wide angle X-ray flat camera.

FIG. 1 is an example of a X-ray pattern of polypropylene having a-axial orientation. The longitudinal direction corresponds to a film-flowing direction (M.D). In FIG. 1, the meridian direction corresponds to a-axis and a diffraction image exhibiting orientation to the direction (one pair of white lines at a lower portion and an upper portion in the horizontal direction) is clearly observed.

Figure 2:
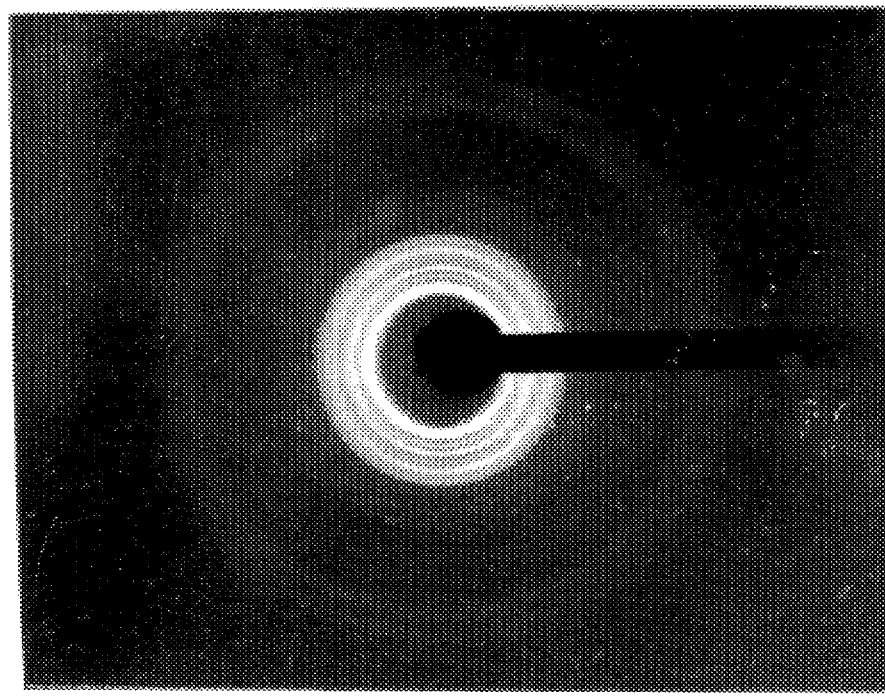
FIG. 2 is a photograph showing a diffraction image of conventional polypropylene (PP–4) according to a X-ray diffraction method.

On the other hand, FIG. 2 is an example of polypropylene having no a-axial orientation wherein its diffraction image displays a shape of ring since its crystal has no orientation.

When the (A) polyolefin in the present invention has no a-axial orientation, improvement effects in anisotropy are not provided.

The (A) polyolefin in the present invention includes, for example, polypropylene irradiated with electron beams or gamma-rays in vacuum or in an inert gas atmosphere, polypropylene obtained in the presence of δ type of porous titanium trichloride as a catalyst, high density polyethylene obtained in the presence of a fixed catalyst supported chromium or molybdenum on silica or alumina carrier and then sintered thereof at a high temperature, etc.

The (B) propylene resin for use in the present invention includes polypropylene, block copolymer of ethylene/propylene, random copolymer of ethylene/propylene, copolymer of ethylene/butene/propylene and a mixture of at least two polymers thereof, furthermore having the following properties.

That is, the (B) polypropylene resin has (f) a ratio $(\eta_1/\eta_2)$ of kinematic viscosity $\eta_1$ at a frequency of $10^{-1}$ rad/sec to kinematic viscosity $\eta_2$ at a frequency of 10 rad sec at a temperature of 190° C. according to a kinematic viscoelasticity determination method of below 4.

Moreover, the (B) propylene resin has (g) no crystal structure exhibiting a-axial orientation in a diffraction pattern according to a X-ray diffraction method. The example of the X-ray diffraction pattern is shown in FIG. 2.

It is preferable that the (B) propylene resin has a ratio (Mw/Mn) of weight average molecular weight Mw to number average molecular weight Mn according to a gel permeation chromatography of below 8, more preferably 4.0 to 5.5.

The mixing proportion of (A) polyolefin in the polyolefin composition according to the present invention is 1 to 99% by weight, preferably 3 to 50% by weight, more preferably 5 to 40% by weight. When a mixing proportion of the (A) polyolefin is below 1% by weight, improvement effects for anisotropy in mechanical strength is not provided, whereas above 99% by weight impact strength tends to deteriorate.

MFR (measured under a load of 2.16 kg at 230° C. according to JIS K7210) of the polyolefin composition according to the present invention is not particularly limited, and is usually in a range of 0.1 to 100 g/10 minutes, depending on molding methods.

The (C) block copolymer of propylene/ethylene for use in the present invention is a block copolymer obtained by two or more steps of polymerization of propylene with at least one member selected the group consisting of ethylene and α-olefin having 4 to 12 carbon atoms. Examples of α-olefin include butene-1, 4-methylpentene-1, hexene-1, octene-1, etc.

The present polyolefin composition can contain conventional additives, if required. Examples of additives include a nucleating agent, an antioxidant, an ultraviolet absorber, an antistatic agent, a plasticizer, a lubricating agent, a coloring agent, various fillers, etc.

As procedure for blending the above-mentioned components to prepare the present polyolefin in composition, known conventional procedures, for example, a procedure for blending using a ribbon blender, a Henschel mixer, etc., and a procedure for melt-kneading using a kneader, mixing rolls, a Banbury mixer, an extruder, etc., are suitably applied.

Method for molding applicable to the present resin composition is not particularly limited. For example, extrusion molding, injection molding, blow molding, compression molding, etc., can be applied. By these methods, it is possible to mold films, sheets, tubes, bottles, etc. The present polyolefin composition is used alone or in a lamination of other materials.

The multilayered laminate according to the present invention comprises a layer of polyolefin composition comprising the above-mentioned components (A) and (B) (hereinafter referred to as "X layer") and a layer of the above-mentioned (C) block copolymer of propylene/ethylene (hereinafter referred as to "Y layer").

The proportion of thickness of X layer to the total thickness of X layer and Y layer is usually 1 to 80%, preferably 5 to 50%, more preferably 10 to 40%. When the proportion of the thickness of X layer is below 1%, tearability deteriorates, whereas above 80% impact strength tends to deteriorate.

In the present invention, X layer and Y layer may be laminated in the adjacency to each other, or through an adhesive resin layer or other resin layers.

As procedure for laminating X layer and Y layer, conventional known procedures, for example, dry laminating, coextrusion molding, extrusion coating, etc., are suitably applied.

Moreover, the laminate formed through an adhesive resin in the layer structure of the present multilayered laminate in the most inner layer/aluminum foil/polyester is used as a retort pouch.

PREFERRED EMBODIMENTS OF THE INVENTION

The present invention will be described in detail below, referring to Examples, which show embodiments of the present invention and are not limitative of the present invention.

In the following Examples and Comparative Examples, the following test methods were employed.

Film tensile strength test

Tensile strength at yield, tensile strength at break and elongation at break were measured at a tensile velocity of 500 mm/min according to JIS Z1707.

Film Young's modulus test

Measurement was made according to ASTM D882.

Film tear strength test

Ermendorf's tear strength was measured according to JIS K7128B.

Film cutting ability test

The situation in case of cutting a film into a form of circle with empty hands was observed and evaluation was made based on the following four standards:

⊚: Possible to easily cut a film.

○: Possible to cut a film with some resistance.

Δ: Managed to cut a film somehow or other, though it is difficult to cut the film since a portion of the film has stretched.

X: Impossible to cut a film because the film has stretched.

Flexural modulus test

Measurement was made at 23° C. and a relative humidity of 50% according to JIS K7203.

Falling impact test 290 ml of water was charged into each ten cylindrical bottles having a capacity of 300 ml (inner diameter; 55 mm, thickness; 1.0 mm), prepared by blow molding. Then, the cylindrical bottles were allowed to fall from a height of 1 m at 0° C. The proportion of the breaks was represented by %.

Heat sealability

Each other of X layers in a multilayered laminate was heat-sealed by a heat sealer, made by Tester Sangyo, K.K., under a pressure of 2 kg/cm² at a seal time of 1 second to prepare a test piece having a width of 15 mm and a strip-shape of paper. Then, its heat seal strength was measured at a tensile speed of 300 mm/minute by a tensile tester, made by Orientic K.K. and then a temperature at which the heat seal strength came to be a width of 1 kg/15 mm or above was determined. In this case, the temperature was changed in the interval of 5° C.

Film impact strength test

Measurement was made by a pendulum-type, impact tester (½-inch hemisphere), made by Toyo Seiki Seisakusho, K.K., Japan.

(A) Preparation of polyolefin

Powders of polypropylene having MFR of 0.6 g/10 min. (at 230° C. under a load of 2.16 kg) were subjected to irradiation with 5 Mrad as a dose of radioactivity by an electron ray irradiation apparatus, made by Nissin Highvoltage K.K., Japan, in a bag of a multilayered film (polyethylene/copolymer of ethylene-vinylalcohol/polyethylene) having a thickness of 100 μm replaced with nitrogen, and then to a heat treatment at 130° C. for 60 minutes to prepare polypropylene (PP–1).

In the same manner as in PP–1, the powders of polypropylene were subjected to irradiation with 10 Mrad as a dose of radioactivity and then to a heat treatment at 130° C. for 60 minutes to prepare polypropylene (PP–2).

A δ type-titanium trichloride obtained by the following process was used for preparation of propylene (PP–3). This is, β type-titanium trichloride obtained by reduction of titanium tetrachloride with diethylaluminum chloride was treated with isoamylether to extract aluminum trichloride contained as an eutectic crystal and then treated with titanium tetrachloride, whereby a δ type-titanium trichloride catalyst was obtained.

Propylene gas was charged in a stainless autoclave of 5 l at 80° C. in the presence of the above-mentioned δ type-titanium trichloride catalyst to prepare polypropylene (PP–3) having MFR of 8.8 g/10 min.

Isobutane was charged in an autoclave of 5 l in the presence of a fixed catalyst supported chromium trioxide on a silica-aluminum carrier and sintered thereof at 820° C. and then ethylene gas was charged thereto at 80° C. to prepare polyethylene (PE–1) having MFR of 11.3 g/10 min. (JIS K7210, 190° C. under a load of 2.16 kg).

The solid catalyst obtained by the following process was used for preparation of polyethylene (PE–2) for comparison. That is, aluminum chloride anhydride, diphenyldiethoxysilane and magnesium ethylate were reacted to wash with n-hexane and then reacted titanium tetrachloride, whereby a solid catalyst was obtained.

Ethylene gas was charged in an autoclave of 5 l at 80° C. in the presence of the above-mentioned solid catalyst to prepare polyethylene (PE–2) for comparison having MFR of 12.5 kg/10 min.

(B) Preparation of propylene resin

The catalyst obtained by the following process was used for preparation of polypropylene (PP–4). That is, a crystal obtained by adding aluminum trichloride to titanium trichloride and γ-butylolactone were pulverized together, whereby a catalyst was obtained.

Propylene gas was charged in an autoclave of 5 l at 80° C. in the presence of the above-mentioned catalyst to prepare polypropylene (PP–4) having MFR of 7.8 g/10 min. (JIS K7210, at 230° C., under a load of 2.16 kg).

Moreover, in the same manner as in polypropylene (PP–4) except that titanium tetrachloride, triethylaluminum and cyclohexylmethyldimethoxysilane were used as components of a catalyst, polypropylene (PP–5) having MFR of 6.1 g/10 min. was prepared.

In the same manner as in polypropylene (PP–5), polypropylene (PP–6) having MFR of 8.5g/10 min. and random copolymer of ethylene/propylene (PP–7) having an ethylene content of 3.0% by weight and MFR of 0.5 g/10 min. were prepared.

The ratio of Mw/Mn of PP–4, –5, –6 and –7 each was 6.1, 4.8, 6.8 and 6.2.

The kinematic viscosity ratio of $\eta_1/\eta_2$, Tmp/Tcp, Tmp/(Tmp–Tcp) and existence or no existence of a-axial orientation are in table 1.

(C) Preparation of block copolymer of propylene/ethylene

Block copolymer o propylene/ethylene (herein after referred to as BPP) having an ethylene content of 11.6% by weight and MFR of 2.3 g/10 min. was prepared.

EXAMPLE 1

5 parts by weight of PP–1 as (A) component, 95 parts by weight of PP–4 as (B) component, 0.35 parts by weight of 1,3,2,4-di(methylbenzylidene)sorbitol as a nucleating agent, 0. parts by weight of pentaerythrityl-tetrakis [3-(3,5-di-t-butyl-4-hydroxylphenyl) propionate] and 0.05 parts by weight of octadencyl-3-(3,5-di-t-butyl-hydroxyphenyl) propionate as antioxidants and 0. parts by weight of calcium stearate as a stabilizer were mixed by a super mixer, SMV-20, made by Kawata Seisakusho K.K., Japan and then pelletized through a vent-type twin screw extruder, AS-302, made by Tanifuji Kikai Kogyo K.K., Japan. From the thus obtained pellets, films having a thickness of 40 μm were obtained through a die film unit, 40 mmφ T, made by Yosii Tekko K.K., Japan, and the films were tested for tensile strength, Young's modulus, tear strength, cutting ability and flexural modulus. The results are shown in table 2.

EXAMPLES 2 TO 11 AND COMPARATIVE EXAMPLES 1 to 5

Films were prepared and evaluated in the same manner as in Example 1 except that (A) component and (B) component in species and blending amounts shown in table 2 were used. The results are shown in Table 2. Falling impact was tested for Examples 4, 5, 8 and 11 and Comparative Examples 5 and 6, in which blow molding can be conducted.

EXAMPLE 12

10 parts by weight of PP–1 as (A) component constituting X layer, 90 parts by weight of PP–5 as (B) component, 0.1 parts by weight of pentaery-thrityl-tetrakis [3-(3,5-di-t-butyl-4-hydroxyphenyl) propionate and 0.05 parts by weight of octadencyl-3-(3,5-di-t-butyl-hydroxyphenyl)propionate as antioxidants, 0.1 parts by weight of calcium stearate as a stabilizer and 0.35 parts by weight of 1,3,2,4-di (methylbenzylidene) sorbitol as a nucleating agent were mixed by a super mixer, SMV-20, made by Kawata Seisakusho K.K., Japan and then pelletized through a vent-type twin screw extruder, AS-302, made by Tanifuji Kikai Kogyo K.K., Japan. The thus obtained pellets and BPP each were extruded into a shape of film having a thickness of 10 μm and 60 μm through a die multilayer coextruder, 40 mmφ T, made by Yoshii Tekko K.K., Japan and then immediately laminated by heat press.

The thus obtained laminates were tested for tensile strength, Young's modulus, tear strength, cutting ability, heat sealability and film impact strength. The results are shown in table 3.

EXAMPLES 13 TO 21 AND COMPARATIVE EXAMPLES 6 TO 9

Laminates were prepared and evaluated in the same manner as in Example 12 except that X layer and Y layer in species and blending amounts shown in table 3 (only Y layer in Comparative Example 4) were used. The results are shown in table 3.

The polyolefin composition according to the present invention has well-balanced properties in which anisotropy in mechanical strength is small, furthermore great tearability, superior rigidity and thus is applicable to wide fields as various molded articles including films.

Moreover, the multilayered laminate according to the present invention is excellent in tearability, rigidity, impact resistance and heat sealability and thus is applicable to wide fields as packing materials including retort packing materials.

TABLE 1

| Component | Species | Kinematic viscosity ratio ($\eta 1/\eta 2$) | Tmp (°C.) | Tcp (°C.) | Tmp/Tcp | Tmp/(Tmp-Tcp) | X-ray diffraction, a-axial orientation |
|---|---|---|---|---|---|---|---|
| (A) component | PP-1 | 8.2 | 159.1 | 123.1 | 1.29 | 4.41 | exist |
|  | PP-2 | 10.4 | 159.4 | 123.5 | 1.29 | 4.44 | exist |
|  | PP-3 | 6.3 | 163.1 | 113.6 | 1.44 | 3.29 | exist |
|  | PE-1 | 7.3 | 134.3 | 116.3 | 1.15 | 7.46 | exist |
|  | PE-2*1 | 3.0 | 130.5 | 109.7 | 1.12 | 6.27 | Non-exist |
| (B) component | PP-4 | 2.1 | — | — | — | — | Non-exist |
|  | PP-5 | 2.3 | — | — | — | — | Non-exist |
|  | PP-6 | 2.2 | — | — | — | — | Non-exist |
|  | PP-7 | 3.6 | — | — | — | — | Non-exist |

Note:
*1 for comparison

TABLE 2

| Example and Comp. Ex. | Species of resin (A) Component (B) Component | Amount (parts by weight) | Test direction | Tensile test Strength at yield (kg/cm²) | Strength at break (kg/cm²) | Elongation at break (%) | Young's modulus (kg/cm²) | Tear strength (kg/mm) | Cutting-ability | Flexural modulus (kg/cm²) | Failing impact test break proportion (%) |
|---|---|---|---|---|---|---|---|---|---|---|---|
| Example 1 | PP-1 | 5 | M.D | 341 | 290 | 80 | 10300 | 3.2 | ⊚ | 13800 | — |
|  | PP-4 | 95 | T.D | — | 328 | 20 | 10200 | 3.8 |  |  |  |
| Example 2 | PP-1 | 10 | M.D | — | 354 | 5 | 12100 | 2.4 | ⊚ | 14100 | — |
|  | PP-5 | 90 | T.D | — | 348 | 5 | 13400 | 2.6 |  |  |  |
| Example 3 | PP-2 | 10 | M.D | — | 354 | 5 | 16700 | 1.6 | ⊚ | 15200 | — |
|  | PP-5 | 90 | T.D | — | 343 | 5 | 15700 | 2.5 |  |  |  |
| Example 4 | PP-2 | 20 | M.D | — | 355 | 5 | 16600 | 2.9 | ⊚ | 15100 | 10 |
|  | PP-5 | 80 | T.D | — | 345 | 5 | 15000 | 3.1 |  |  |  |
| Example 5 | PP-2 | 50 | M.D | — | 339 | 5 | 16000 | 2.6 | ⊚ | 14800 | 20 |
|  | PP-5 | 50 | T.D | — | 328 | 5 | 14100 | 3.0 |  |  |  |
| Example 6 | PP-3 | 10 | M.D | — | 374 | 5 | 18300 | 2.1 | ⊚ | 15300 | — |
|  | PP-4 | 90 | T.D | — | 361 | 5 | 16100 | 2.3 |  |  |  |
| Example 7 | PE-1 | 10 | M.D | — | 328 | 10 | 11000 | 1.1 | ⊚ | 12800 | — |
|  | PP-5 | 90 | T.D | — | 312 | 10 | 9100 | 1.3 |  |  |  |
| Example 8 | PE-1 | 50 | M.D | — | 304 | 20 | 9200 | 0.9 | ⊚ | 12500 | 20 |
|  | PP-5 | 50 | T.D | — | 272 | 10 | 9100 | 1.4 |  |  |  |
| Example 9 | PP-1 | 10 | M.D | — | 368 | 10 | 12800 | 2.3 | ⊚ | 14300 | — |
|  | PP-6 | 90 | T.D | — | 359 | 10 | 13800 | 2.5 |  |  |  |
| Example 10 | PP-2 | 10 | M.D | — | 362 | 10 | 16400 | 1.8 | ⊚ | 14500 | — |
|  | PP-6 | 90 | T.D | — | 355 | 10 | 16100 | 2.2 |  |  |  |
| Example 11 | PP-2 | 5 | M.D | 358 | 320 | 60 | 10100 | 3.2 | ○ | 12600 | 0 |
|  | PP-7 | 95 | T.D | — | 332 | 20 | 10300 | 3.5 |  |  |  |
| Comp. Ex. 1 | — | 0 | M.D | 326 | 670 | 910 | 10500 | 3.8 | X | 12600 | — |
|  | PP-4 | 100 | T.D | 316 | 450 | 1100 | 10400 | 6.2 |  |  |  |
| Comp. Ex. 2 | — | 0 | M.D | 382 | 310 | 280 | 12300 | 3.4 | X | 13200 | — |
|  | PP-5 | 100 | T.D | 350 | 280 | 80 | 13700 | 6.4 |  |  |  |
| Comp. Ex. 3 | PE-2 | 10 | M.D | 346 | 280 | 410 | 11000 | 1.1 | X | 11400 | — |
|  | PP-5 | 90 | T.D | 318 | 80 | 100 | 9500 | 2.3 |  |  |  |
| Comp. Ex. 4 | — | 0 | M.D | 385 | 320 | 320 | 12700 | 3.2 | X | 12400 | — |
|  | PP-6 | 100 | T.D | 356 | 290 | 90 | 14100 | 6.1 |  |  |  |
| Comp. Ex. 5 | — | 0 | M.D | 282 | 350 | 710 | 9100 | 3.1 | X | 10100 | 50 |
|  | PP-7 | 100 | T.D | 268 | 315 | 980 | 8200 | 6.3 |  |  |  |
| Comp. Ex. 6 | PP-1 | 100 | M.D | — | 341 | 5 | 10100 | 0.8 | ⊚ | 12300 | 60 |
|  | — | 0 | T.D | — | 321 | 25 | 9400 | 2.1 |  |  |  |

TABLE 3

| Example and Comp. Ex. | X layer (A) Component | (B) Component | Amount (parts by weight) | thickness (μm) | Y layer thickness (μm) | Test direction | Strength at yield (kg/cm²) | Strength at break (kg/cm²) | Elongation at break (%) |
|---|---|---|---|---|---|---|---|---|---|
| Example 12 | PP-1 | | 10 | 10 | 60 | M.D | 269 | 470 | 700 |
| | PP-5 | | 90 | | | T.D | 210 | 230 | 690 |
| Example 13 | PP-1 | | 10 | 20 | 50 | M.D | 266 | 450 | 680 |
| | PP-5 | | 90 | | | T.D | 200 | 180 | 550 |
| Example 14 | PP-1 | | 10 | 35 | 35 | M.D | 264 | 420 | 630 |
| | PP-5 | | 90 | | | T.D | 230 | 230 | 700 |
| Example 15 | PP-1 | | 5 | 10 | 60 | M.D | 267 | 460 | 670 |
| | PP-5 | | 95 | | | T.D | 213 | 240 | 680 |
| Example 16 | PP-1 | | 20 | 20 | 50 | M.D | 276 | 380 | 540 |
| | PP-5 | | 80 | | | T.D | 224 | 180 | 510 |
| Example 17 | PP-1 | | 50 | 15 | 55 | M.D | 287 | 240 | 230 |
| | PP-5 | | 50 | | | T.D | 261 | 160 | 190 |
| Example 18 | PP-2 | | 10 | 10 | 60 | M.D | 273 | 450 | 640 |
| | PP-5 | | 90 | | | T.D | 221 | 200 | 610 |
| Example 19 | PP-3 | | 15 | 20 | 50 | M.D | 318 | 430 | 610 |
| | PP-5 | | 85 | | | T.D | 281 | 210 | 560 |
| Example 20 | PP-1 | | 10 | 10 | 60 | M.D | 263 | 440 | 670 |
| | PP-4 | | 90 | | | T.D | 208 | 210 | 640 |
| Example 21 | PE-1 | | 5 | 20 | 50 | M.D | 256 | 410 | 660 |
| | PP-5 | | 95 | | | T.D | 211 | 200 | 620 |
| Comp. Ex. 6 | — | | — | — | 70 | M.D | 210 | 400 | 550 |
| | | | — | — | | T.D | 147 | 160 | 370 |
| Comp. Ex. 7 | — | | — | 10 | 60 | M.D | 276 | 480 | 780 |
| | PP-5 | | 100 | | | T.D | 220 | 220 | 750 |
| Comp. Ex. 8 | — | | — | 20 | 50 | M.D | 273 | 460 | 820 |
| | PP-4 | | 100 | | | T.D | 218 | 210 | 770 |
| Comp. Ex. 9 | PE-2 | | 30 | 10 | 60 | M.D | 231 | 360 | 680 |
| | PP-5 | | 70 | | | T.D | 197 | 170 | 640 |

| Example and Comp. Ex. | Young's modulus (kg/cm²) | Tear strength (kg/mm) | Cutting-ability | Heatseal-ability (°C.) | Film impact strength (kg-cm/mm) 23° C. | −5° C. |
|---|---|---|---|---|---|---|
| Example 12 | 11900 | 5.8 | ⊙ | 145 | 331 | 79 |
| | 9000 | 88 | | | | |
| Example 13 | 12000 | 4.4 | ⊙ | 145 | 223 | 71 |
| | 9200 | 67 | | | | |
| Example 14 | 12300 | 3.4 | ⊙ | 145 | 126 | 62 |
| | 9700 | 49 | | | | |
| Example 15 | 11600 | 7.1 | ○ | 145 | 338 | 83 |
| | 9100 | 97 | | | | |
| Example 16 | 13100 | 3.1 | ⊙ | 145 | 216 | 67 |
| | 10500 | 48 | | | | |
| Example 17 | 12100 | 5.4 | ⊙ | 145 | 108 | 48 |
| | 9600 | 82 | | | | |
| Example 18 | 12300 | 4.2 | ⊙ | 145 | 321 | 75 |
| | 9600 | 73 | | | | |
| Example 19 | 13900 | 7.2 | ○ | 145 | 183 | 59 |
| | 11300 | 94 | | | | |
| Example 20 | 11600 | 5.6 | ⊙ | 145 | 323 | 72 |
| | 8800 | 86 | | | | |
| Example 21 | 11200 | 7.8 | ○ | 145 | 342 | 91 |
| | 8800 | 96 | | | | |
| Comp. Ex. 6 | 10700 | 15.6 | X | 155 | 142 | 81 |
| | 8200 | 152 | | | | |
| Comp. Ex. 7 | 12100 | 18.1 | X | 150 | 136 | 76 |
| | 9300 | 162 | | | | |
| Comp. Ex. 8 | 12300 | 17.4 | X | 150 | 78 | 31 |
| | 9500 | 156 | | | | |
| Comp. Ex. 9 | 10500 | 10.3 | Δ~X | 145 | 181 | 63 |
| | 8000 | 106 | | | | |

What is claimed is:

1. A multilayered laminate which comprises the following (i) and (ii):

(i) a layer of a polyolefin composition comprising;

(A) 1 to 99% by weight of a polyolefin having the following properties of (a) to (e);

(a) a ratio ($\eta_1/\eta_2$) of kinematic viscosity $\eta_1$ at a frequency of $10^{-1}$ rad/sec to kinematic viscosity $\eta_2$ at a frequency of 10 rad/sec at a temperature of 190° C. according to a kinematic viscoelasticity determination method of 4 to 20, (b) a crystallization peak temperature Tcp according to a Differential Scanning Calorimetry (DSC) of 110° to 130° C., (c) a ratio (Tmp/Tcp) of melting peak temperature Tmp to crystallization peak temperature Tcp according to a Differential Scanning Calorimetry (DSC) of 1.1 to 1.5, (d) Tmp/(Tmp−Tcp)=3.0 to 9.8, and (e) a crystal structure exhibiting a-axial orientation in a diffraction pattern according to a X-ray diffraction method, and (B) 99 to 1% by weight of a propylene resin having the following properties of (f) and (g);

(f) a ratio ($\eta_1/\eta_2$) of kinematic viscosity $\eta_1$ at a frequency of $10^{-1}$ rad/sec to kinematic viscosity $\eta_2$ at a frequency of 10 rad/sec at a temperature of 190° C. according to a kinematic viscoelasticity determination method of below 4, and (g) and no crystal structure exhibiting a-axial orientation in a diffraction pattern according to a X-ray diffraction method, and (ii) a layer of (C) block copolymer of propylene/ethylene.

2. A multilayerd laminate according to claim 1, wherein the (B) propylene resin has a ratio (Mw/Mn) of weight average molecular weight Mw to number average molecular weight Mn according to a gel permeation chromatgraphy of 8 or below.

3. A retort packaging material used the multilayerd laminate according to claim 1.

4. A retort packaging material used the multilayerd laminate according to claim 2.

* * * * *